United States Patent
Passelande et al.

(10) Patent No.: US 12,428,127 B2
(45) Date of Patent: Sep. 30, 2025

(54) AIRCRAFT CENTRAL WING BOX COMPRISING BEAMS PRESSED RESPECTIVELY AGAINST OUTER FACES OF THE TOP AND BOTTOM PANELS OF SAID BOX, EACH PROVIDED WITH AT LEAST ONE ATTACHMENT PASSING THROUGH THE TOP OR BOTTOM PANEL

(71) Applicants: Airbus SAS, Blagnac (FR); Airbus Operations SAS, Toulouse (FR)

(72) Inventors: Frédéric Passelande, Rochefort (FR); Alain Her, Rochefort (FR); Obeida Manaa, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/599,497

(22) Filed: Mar. 8, 2024

(65) Prior Publication Data
US 2024/0308643 A1 Sep. 19, 2024

(30) Foreign Application Priority Data
Mar. 16, 2023 (FR) ...................................... 2302427

(51) Int. Cl.
*B64C 3/26* (2006.01)
*B64C 1/26* (2006.01)

(52) U.S. Cl.
CPC . *B64C 3/26* (2013.01); *B64C 1/26* (2013.01)

(58) Field of Classification Search
CPC .. B64C 1/26; B64C 3/18; B64C 3/185; B64C 3/26
See application file for complete search history.

(56) References Cited

U.S. PATENT DOCUMENTS

| 6,412,251 | B1 | 7/2002 | Early |
| 7,597,287 | B2 * | 10/2009 | Gay ......................... B64C 3/18 |
| | | | 14/4 |
| 2002/0100840 | A1 | 8/2002 | Billinger et al. |
| 2009/0121082 | A1 | 5/2009 | Godenzi et al. |
| 2015/0329197 | A1 | 11/2015 | Seack et al. |
| 2022/0289365 | A1 * | 9/2022 | Orteu ....................... B64C 1/10 |
| 2023/0079075 | A1 | 3/2023 | Plet et al. |

FOREIGN PATENT DOCUMENTS

| CA | 2326243 C | 2/2009 |
| EP | 4147966 A1 | 3/2023 |

OTHER PUBLICATIONS

French Search Report for corresponding French Patent Application No. 2302427 dated Sep. 5, 2023.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

A central wing box comprising at least one first beam positioned against the outer face of a top panel of the central wing box and linked thereto, at least one second beam positioned against the outer face of a bottom panel of the central wing box and linked thereto, at least one first attachment forming a single piece with the first beam, protruding from the inner face (Fint) of the top panel and at least one second attachment forming a single piece with the second beam, protruding from the inner face (Fint) of the bottom panel, the top and bottom panels comprising, for each first or second attachment, a through-hole to allow the first or second attachment to pass through them.

6 Claims, 4 Drawing Sheets

AIRCRAFT CENTRAL WING BOX COMPRISING BEAMS PRESSED RESPECTIVELY AGAINST OUTER FACES OF THE TOP AND BOTTOM PANELS OF SAID BOX, EACH PROVIDED WITH AT LEAST ONE ATTACHMENT PASSING THROUGH THE TOP OR BOTTOM PANEL

CROSS-REFERENCES TO RELATED APPLICATIONS

This application claims the benefit of French Patent Application Number 2302427 filed on Mar. 16, 2023, the entire disclosure of which is incorporated herein by way of reference.

FIELD OF THE INVENTION

The present application relates to an aircraft central wing box comprising beams pressed respectively against outer faces of the top and bottom panels of said box, each provided with at least one attachment passing through the top or bottom panel, and an aircraft comprising said central wing box.

BACKGROUND OF THE INVENTION

According to an embodiment visible in FIG. 1, an aircraft comprises a fuselage 10 which extends between a nose cone 10.1 and a tail cone 10.2, wings 12 and a central wing box 14 linking the wings 12 and the fuselage 10.

For the present application, a longitudinal direction is a direction parallel to a longitudinal axis, which is horizontal when the aircraft is on the ground, and extends between the nose and tail cones 10.1, 10.2. A longitudinal plane is a vertical plane when the aircraft is on the ground and parallel to the longitudinal axis. A transverse plane is a plane at right angles to the longitudinal axis.

The central wing box 14 comprises a top panel 16, a bottom panel 18, a front spar 20 and a rear spar 22, the front and rear spars 20, 22 being positioned in transverse planes that are offset in the longitudinal direction. The top and bottom panels 16, 18 and the front and rear spars 20, 22 each have an inner face Fint oriented towards the interior of the central wing box 14, an outer face Fext opposite the inner face Fint and stiffeners 24 positioned on the inner face Fint.

According to an embodiment visible in FIGS. 2 to 5, the central wing box 14 also comprises at least one longitudinal beam 26 positioned against the outer face Fext of the bottom panel 18 and linked thereto by link elements 28. According to one configuration, the longitudinal beam 26 comprises a first web 26.1 and a first flange 26.2 pressed against the outer face Fext of the bottom panel 18.

In addition, the central wing box 14 comprises at least one connecting rod 30 linked to the bottom panel 18 by an attachment 32 positioned against the inner face Fint of the bottom panel 18 and linked thereto by link elements.

According to one embodiment, each attachment 32 comprises a second web 32.1 positioned in a longitudinal plane and second flanges 32.2, 32.2' positioned on either side of the second web 32.1. Thus, the attachment 32 has, in transverse planes, a T section. The second flanges 32.2, 32.2' are pressed against the inner face Fint of the bottom panel 18 and linked thereto by link elements.

According to one mode of assembly, the longitudinal beam 26 and the attachment 32 are positioned on either side of the bottom panel 18 and linked thereto by common link elements 28 which pass through the bottom panel 18, the first and second flanges 26.2, 32.2, 32.2' of the longitudinal beam 26 and the attachment 32.

This embodiment is not satisfactory because of the significant number of parts to be assembled. These different parts have to be adjusted, shimmed and positioned with respect to one another. For each link element 28, the stacked parts are drilled then the link elements put in place. Consequently, the assembly of the three parts (bottom panel 18, longitudinal beam 26 and attachment 32) is difficult to automate.

SUMMARY OF THE INVENTION

The present invention aims to remedy all or part of the drawbacks of the prior art.

To this end, the subject of the invention is a central wing box comprising:
- top and bottom panels and front and rear spars linked pairwise so as to form a box structure and each having an inner face and an outer face opposite the inner face,
- at least one first beam positioned against the outer face of the top panel and linked to the top panel by link elements,
- at least one second beam positioned against the outer face of the bottom panel and linked to the bottom panel by link elements,
- at least one first attachment protruding from the inner face of the top panel and at least one second attachment protruding from the inner face of the bottom panel,
- at least one connecting rod having a first end linked to the first attachment and a second end linked to the second attachment.

According to the invention, the first attachment is secured to the first beam and forms with the first beam one and the same part produced in a single piece, the top panel comprising, for each first attachment, a through-hole to allow the first attachment to pass through the top panel. In addition, the second attachment is secured to the second beam and forms with the second beam one and the same part produced in a single piece, the bottom panel comprising, for each second attachment, a through-hole to allow the second attachment to pass through the bottom panel.

This solution makes it possible to reduce the number of parts to be assembled, which makes it possible to simplify the assembly method and potentially automate it.

According to another feature, the first or second beam comprises at least one first web and at least one flange linked to the first web and pressed against the outer face of the top or bottom panel. In addition, the first or second attachment comprises a second web linked to the flange of the first or second beam, the first and second webs being positioned on either side of the flange.

According to another feature, the first web of the first or second beam has a first median plane, the second web of the first or second attachment comprising a second median plane, the first and second median planes being coplanar.

According to another feature, the assembly comprises at least one seal inserted between, on the one hand, the top or bottom panel and, on the other hand, the flange and/or the second web of the first or second beam and configured to ensure a fluid-tightness.

According to another feature, the through-hole and the first or second attachment are configured so as to delimit a small gap between the top or bottom panel and the first or second attachment.

According to another feature, the seal is configured to fill the gap between the top or bottom panel and the first or second attachment.

Also a subject of the invention is an aircraft comprising a central wing box according to one of the preceding features.

BRIEF DESCRIPTION OF THE DRAWINGS

Other features and advantages will emerge from the description of the invention which follows, a description given purely by way of example, in light of the attached drawings in which.

DETAILED DESCRIPTION OF THE PREFERRED EMBODIMENTS

Figure 1:
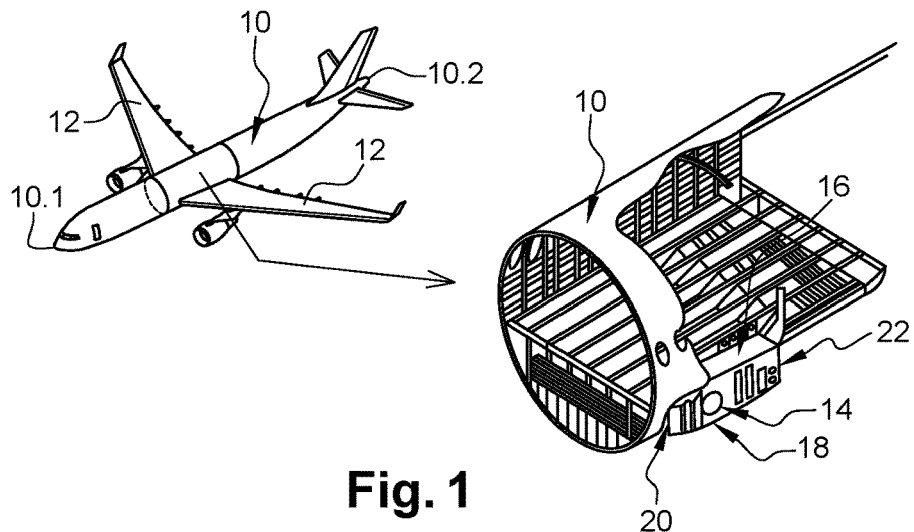
FIG. 1 is a perspective view of an aircraft.
Figure 2:
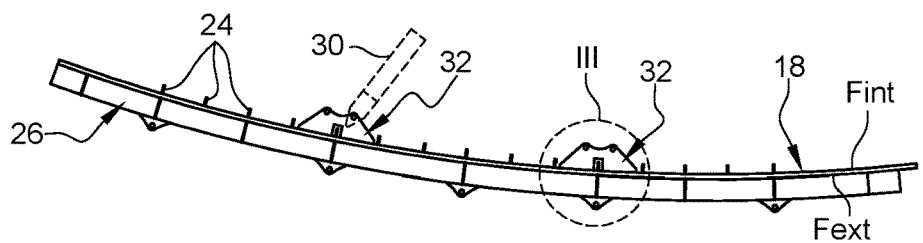
FIG. 2 is a longitudinal cross-section of a bottom part of a central wing box illustrating an embodiment of the prior art.
Figure 3:
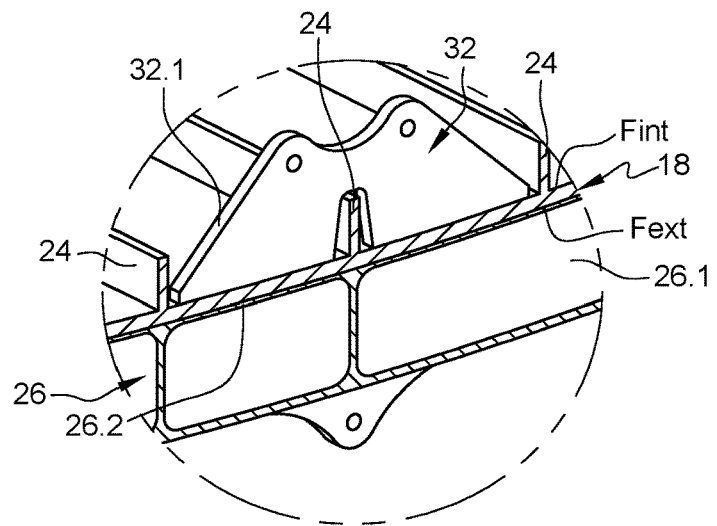
FIG. 3 is a cross-section of a zone III of FIG. 2.
Figure 4:
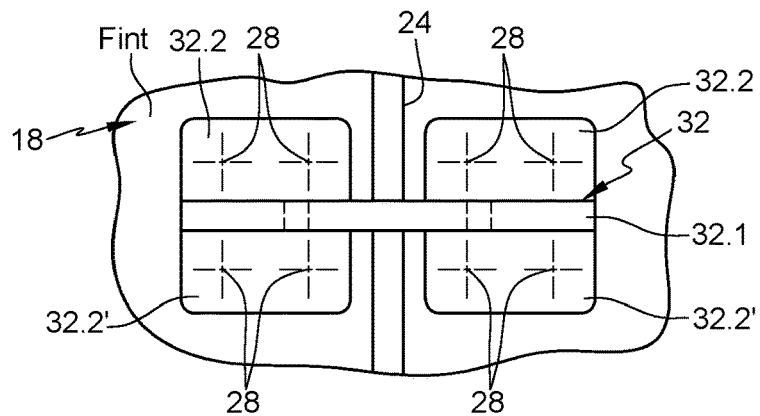
FIG. 4 is a top view of an attachment illustrating an embodiment of the prior art.
Figure 5:
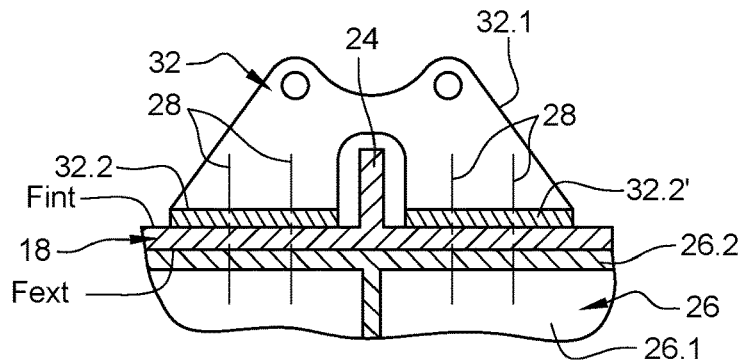
FIG. 5 is a longitudinal cross-section of a part of a central wing box illustrating an embodiment of the prior art.
Figure 6:
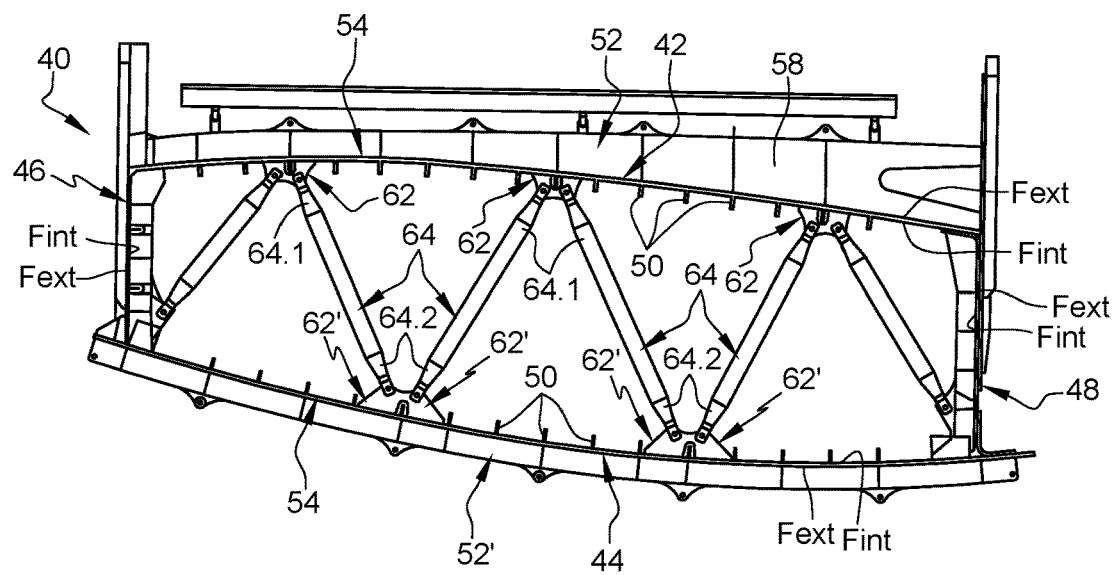
FIG. 6 is a longitudinal cross-section of a central wing box illustrating an embodiment of the invention.
Figure 7:
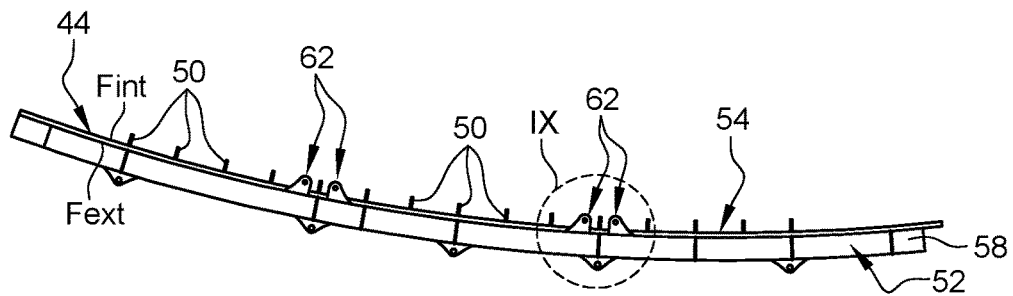
FIG. 7 is a longitudinal cross-section of a bottom part of the central wing box visible in FIG. 6.
Figure 8:
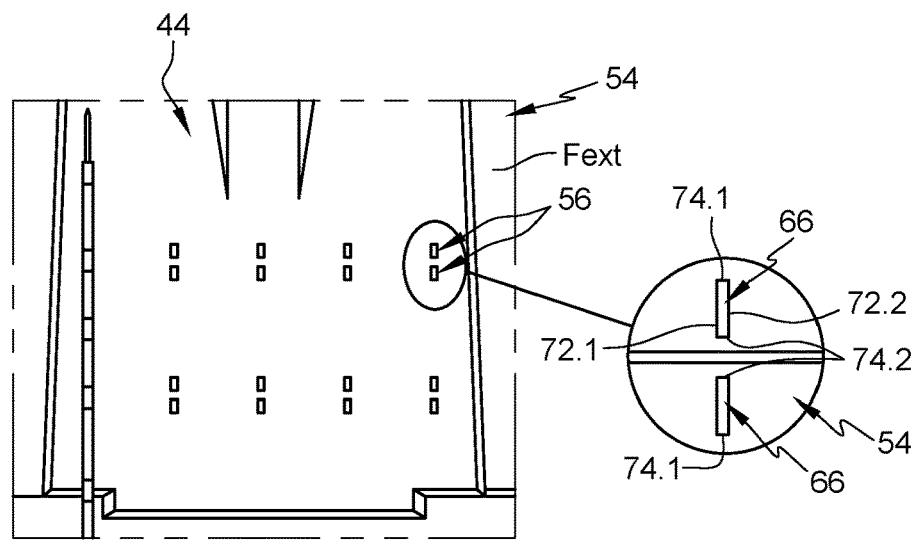
FIG. 8 is a bottom view of a bottom panel of the central wing box visible in FIG. 6.
Figure 9:
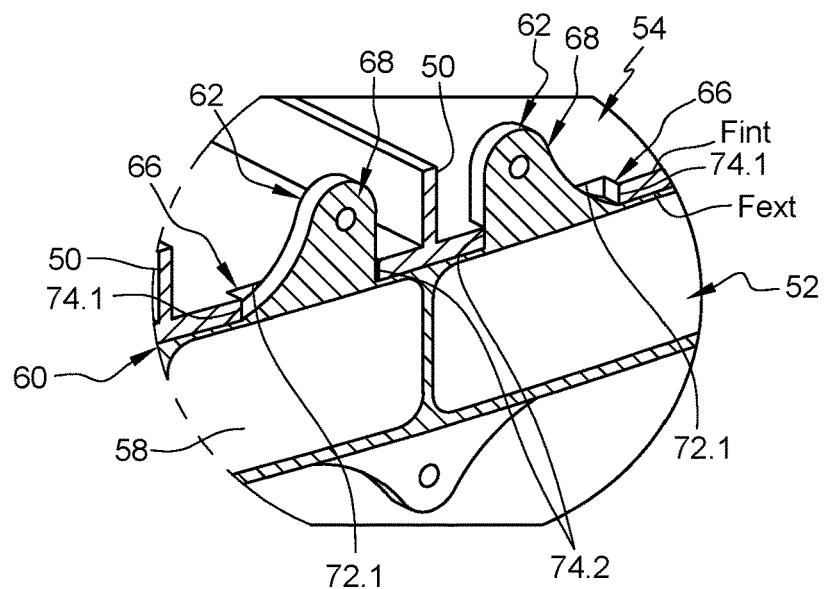
FIG. 9 is a cross-section of a zone IX of FIG. 7.
Figure 10:
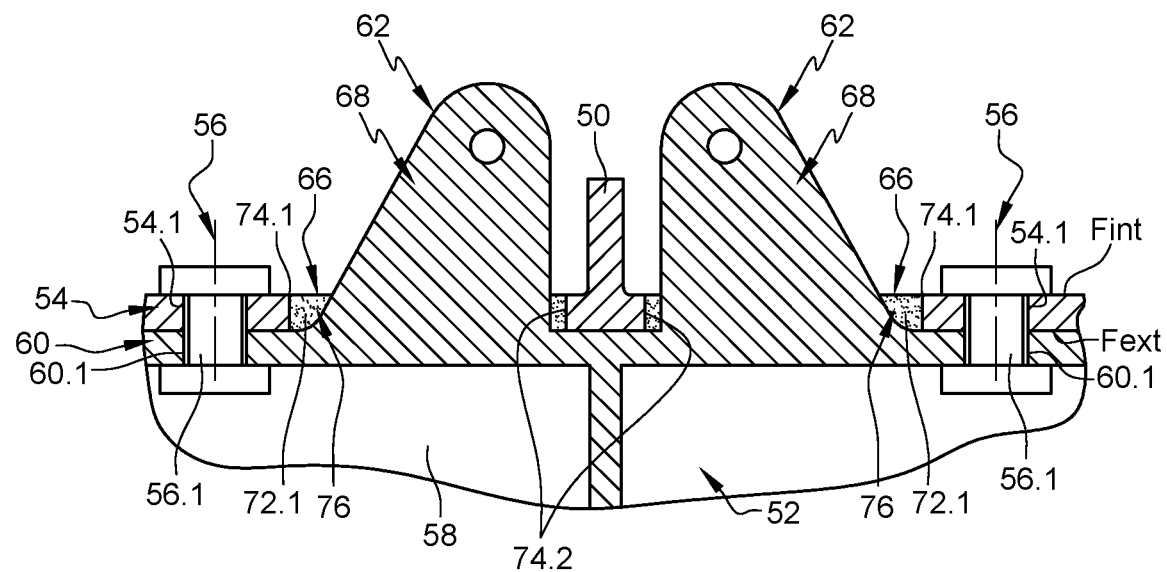
FIG. 10 is a longitudinal cross-section of a part of a central wing box illustrating an embodiment of the invention.
Figure 11:
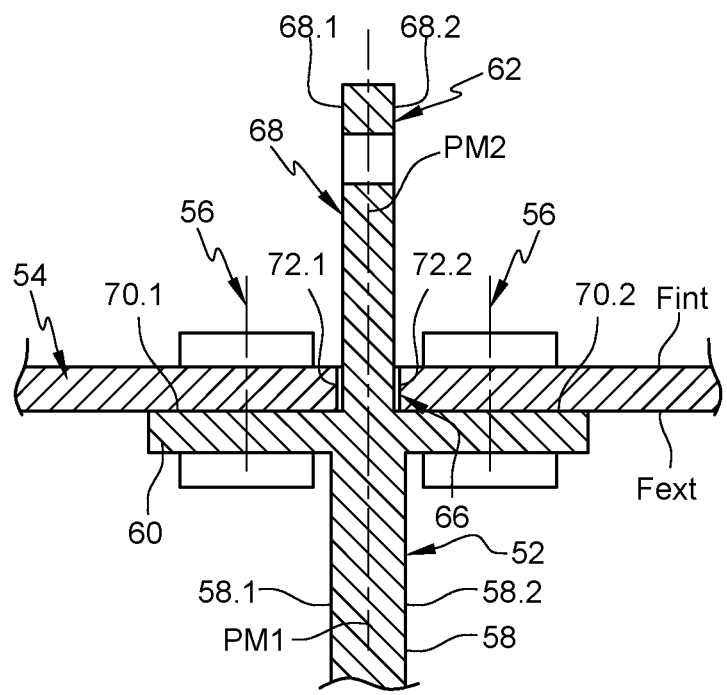
FIG. 11 is a transverse cross-section of a part of a central wing box illustrating an embodiment of the invention.

According to an embodiment visible in FIG. 6, a central wing box 40 of an aircraft comprises a top panel 42, a bottom panel 44, a front spar 46 and a rear spar 48, the front and rear spars 46, 48 being positioned in transverse planes that are offset in the longitudinal direction. The top and bottom panels 42, 44 and the front and rear spars 46, 48 are linked pairwise at junction zones oriented in a joining direction so as to form a box structure. They each have an inner face Fint oriented towards the interior of the central wing box 40 and an outer face Fext opposite the inner face Fint. The inner and outer faces Fint, Fext of each panel or spar are substantially parallel to one another.

According to one configuration, the central wing box 40 comprises stiffeners 50 positioned on the inner face Fint of the top and bottom panels 42, 44 and front and rear spars 46, 48, the stiffeners 50 being oriented in directions parallel to the joining direction.

The central wing box 40 comprises at least one beam 52 positioned against the outer face Fext of at least one wall 54 out of the top and bottom panels 42, 44 and the front and rear spars 46, 48, the beam 52 being linked to the wall 54 by link elements 56. According to one construction, the beam 52 is oriented in a direction parallel to the longitudinal direction.

According to one configuration, the beam 52 comprises at least one first web 58 and at least one flange 60 linked to the first web 58 and pressed against the outer face Fext of the wall 54. The first web 58 has first and second faces 58.1, 58.2 that are symmetrical with respect to a first median plane PM1 parallel to the longitudinal direction. According to one construction, the flange 60 is at right angles to the first web 58 and extends on either side thereof. According to this construction, the beam 52 has an I or T section. Obviously, the invention is not limited to this section for the beam 52.

According to one embodiment, each link element 56 has a rod 56.1 and, for each link element 56, the wall 54 and the flange 60 of the beam 52 each comprise an orifice 54.1, 60.1 passing through the wall 54 and the flange 60 to allow the passage of the rod 56.1.

For each link element 56, the central wing box 40 comprises at least one seal, such as a bead and/or a coating of mastic, to obtain, in line with each link element 56, a tight barrier between the interior and the exterior of the central wing box 40.

The top and bottom panels 42, 44, the front and rear spars 46, 48, the stiffeners 50, the beams 52 and the link elements 56 are not described further because they can be identical to those of the prior art.

The central wing box 40 comprises at least one attachment 62 protruding from the inner face Fint of the wall 54 and at least one element 64, such as a connecting rod for example, positioned in the central wing box 40 and linked to the attachment 62.

According to a feature of the invention, the attachment 62 is secured to the beam 52 and the wall 54 comprises, for each attachment 62, a through-hole 66 to allow the attachment 62 to pass through the wall 54.

According to the invention, the beam 52 and the attachment 62 form one and the same part produced in a single piece.

According to one embodiment, the attachment 62 comprises at least one second web 68 linked to the flange 60 of the beam 52, the first and second webs 58, 68 being positioned on either side of the flange 60. This second web 68 has first and second faces 68.1, 68.2 that are symmetrical with respect to a second median plane PM2. According to one construction, the second web 68 is aligned with the first web 58 of the beam 52. Thus, the first and second median planes PM1, PM2 are coplanar.

According to one construction, the flange 60 has contact surfaces 70.1, 70.2 that are substantially coplanar, positioned on either side of the second web 68 and configured to be pressed against the outer face Fext of the wall 54.

According to one configuration, the contact surfaces 70.1, 70.2 are substantially at right angles to the second median plane PM2. However, the invention is not limited to this configuration.

The through-hole 66 has a rectangular section. Thus, the through-hole 66 is delimited by first and second long edges 72.1, 72.2 that are substantially parallel to one another and by first and second short edges 74.1, 74.2 that are substantially parallel to one another and linking the first and second long edges 72.1, 72.2. These edges 72.1, 72.2, 74.1, 74.2 are substantially at right angles to the inner and outer faces Fint, Fext. Contrary to the prior art, each plate is not pressed against the inner face Fint of the wall 54, which can remain in the raw state and does not need to be machined. According to the invention, only one plate, in this case the flange 60 of the beam 52, requires adjusting and shimming operations, contrary to the prior art which requires adjusting and shimming operations for the flanges of the beam and of the attachment.

The through-hole 66 has a length corresponding to a distance separating the first and second short edges 74.1, 74.2 and a width corresponding to a distance separating the first and second long edges 72.1, 72.2.

The second web 68 has a thickness which corresponds to a distance separating its first and second faces 68.1, 68.2, substantially equal to or very slightly less than the width of the through-hole 66. The length of the through-hole 66 is dimensioned so as to allow the passage of the second web 68 while limiting the gap between the second web 68 and the first and second short edges 74.1, 74.2. Thus, the through-hole 66 and the attachment 62 are configured so as to delimit a small gap between the wall 54 and the attachment 62.

For each attachment 62, the central wing box 40 comprises at least one seal 76, such as a bead of mastic and/or a coating of mastic, to fill the gap between the wall 54 and the attachment 62, and more particularly its second web 68, to obtain, around the second web 68 of the attachment 62, a tight barrier between the interior and the exterior of the central wing box 40.

The forms of the second web 68 can be adapted to facilitate the placement of the seal 76 in the gap between the second web 68 and the wall 54.

In a variant, the seal 76 is positioned between the flange 60 of the beam 52 and the wall 54. Whatever the variant, the central wing box 40 comprises at least one seal 76 inserted between, on the one hand, the wall 54 and, on the other hand, the flange 60 and/or the second web 68 of the beam 52, configured to ensure a fluid-tightness between interior and exterior zones separated by the wall 54.

Several attachments 62 can be linked to the same beam 52. According to one configuration, the central wing box 40 comprises several beams 52 oriented in the longitudinal direction and positioned against the outer faces Fext of the top and bottom panels 42, 44. In addition, the central wing box 40 comprises at least one connecting rod 64 having a first end 64.1 linked to a first attachment 62 secured to a first beam 52 fixed against the outer face Fext of the top panel 42 and a second end 64.2 linked to a second attachment 62' secured to a second beam 52' fixed against the outer face Fext of the bottom panel 44.

According to one embodiment, each beam 52, 52' and the attachments 62, 62' linked to said beam 52, 52' are produced in a single piece by any appropriate manufacturing method.

For each attachment 62, 62', a through-hole 66 is produced in the wall 54 against which the beam 52, 52' to which the attachment 62, 62' is linked is fixed.

A method for assembling a beam 52, 52' comprises a step of adjustment of the position of the beam 52, 52' with respect to the wall 54 by inserting, into a through-hole 66, the second web 68 of each attachment 62, 62' of the beam 52, 52', a step of drilling of the orifices 54.1, 60.1 passing through the wall 54 and the flange 60, a step of placement of the link elements 56 then a step of fitting of a seal 76 to fill the gap between the second web 68 of each attachment 62, 62' and the wall 54.

The invention makes it possible to reduce the number of parts to be assembled, which makes it possible to simplify the assembly method and potentially automate it.

Obviously, the invention is not limited to the central wing box. It could be applied to any assembly comprising a wall 54 having inner and outer faces Fint, Fext, a beam 52 positioned against the outer face Fext of the wall 54 and an attachment 62 protruding from the inner face Fint of the wall 54 and linked to the beam 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A central wing box composing:
    top and bottom panels and front and rear spars linked pairwise so as to form a box structure and each having an inner face (Fint) and an outer face (Fext) opposite the inner face (Fint),
    at least one first beam positioned against the outer face (Fext) of the top panel and linked to the top panel by link elements,
    at least one second beam positioned against the outer face (Fext) of the bottom panel and linked to the bottom panel by link elements,
    at least one first attachment protruding from the inner face (Fint) of the top panel and at least one second attachment protruding from the inner face (Fint) of the bottom panel,
    at least one connecting rod having a first end linked to the at least one first attachment and a second end linked to the at least one second attachment,
    wherein the at least one first attachment is secured to the first beam and forms with the first beam a part produced in a single piece,
    wherein the top panel comprises, for each first attachment, a through-hole to allow said first attachment to pass through the top panel,
    wherein the at least one second attachment is secured to the second beam and forms with the second beam one a part produced in a single piece,
    wherein the bottom panel comprises, for each second attachment, a through-hole to allow said second attachment to pass through the bottom panel,
    wherein the first or second beam comprises at least one first web and at least one flange linked to the at least one first web and pressed against the outer face (Fext) of the top or bottom panel, and
    wherein the at least one first attachment or the at least one second attachment comprises a second web linked to the at least one flange of the first or second beam, the at least one first web and the second web being positioned on either side of the at least one flange.

2. The central wing box according to claim 1, wherein the at least one first web of the first or second beam has a first median plane, and
    wherein the second web of the first or second attachment comprises a second median plane, the first and second median planes being coplanar.

3. The central wing box according to claim 1, further comprising:
    at least one seal inserted between the top or bottom panel and the flange and/or the second web of the first or second beam, the at least one seal configured to ensure a fluid-tightness.

4. The central wing box according to claim 1, wherein the through-hole and the first or second attachment are configured so as to delimit a gap between the top or bottom panel and the first or second attachment.

5. The central wing box according to claim 4, further comprising:

a seal is configured to fill the gap between the top or bottom panel and the first or second attachment.

6. An aircraft comprising:
the central wing box according to claim 1.

\* \* \* \* \*